(12) United States Patent
Arthur et al.

(10) Patent No.: US 7,838,313 B2
(45) Date of Patent: Nov. 23, 2010

(54) PIXEL WELL ELECTRODE

(75) Inventors: Alan R. Arthur, Salem, OR (US); Ronald A. Hellekson, Eugene, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 625 days.

(21) Appl. No.: 11/831,586

(22) Filed: Jul. 31, 2007

(65) Prior Publication Data
US 2009/0032816 A1    Feb. 5, 2009

(51) Int. Cl.
*H01L 21/00* (2006.01)
(52) U.S. Cl. ............................. 438/30; 349/191
(58) Field of Classification Search .............. 438/29, 438/30, 34; 349/191
See application file for complete search history.

(56) References Cited

U.S. PATENT DOCUMENTS

| | | |
|---|---|---|
| 6,590,346 B1 | 7/2003 | Hadley et al. |
| 6,607,413 B2 | 8/2003 | Stevenson et al. |
| 6,693,384 B1 | 2/2004 | Vicentini et al. |
| 6,844,673 B1 | 1/2005 | Bernkopf |
| 6,856,086 B2 | 2/2005 | Grace et al. |
| 2002/0186452 A1 | 12/2002 | Biegelsen |
| 2004/0169176 A1 | 9/2004 | Peterson et al. |
| 2005/0071969 A1 | 4/2005 | Sirringhaus et al. |
| 2005/0176242 A1 | 8/2005 | Kawase |
| 2005/0202580 A1 | 9/2005 | Weng et al. |
| 2005/0266693 A1* | 12/2005 | Maekawa ................. 438/720 |
| 2006/0091496 A1 | 5/2006 | Ulmer et al. |
| 2006/0094147 A1 | 5/2006 | Ulmer et al. |
| 2006/0148167 A1 | 7/2006 | Brown et al. |
| 2006/0245040 A1 | 11/2006 | Betrabet |
| 2006/0249734 A1* | 11/2006 | Aoyama et al. ............... 257/72 |
| 2006/0292312 A1 | 12/2006 | Kim et al. |
| 2008/0130317 A1* | 6/2008 | Shimura et al. ............. 362/620 |
| 2008/0143908 A1* | 6/2008 | Bae et al. ..................... 349/43 |
| 2008/0246906 A1* | 10/2008 | Kim et al. ................... 349/106 |
| 2008/0252200 A1* | 10/2008 | Wang et al. ................. 313/504 |

* cited by examiner

*Primary Examiner*—Zandra Smith
*Assistant Examiner*—Jamie Niesz

(57) ABSTRACT

Various apparatus and methods relating to pixel wells and electrodes that are at least partially concurrently formed are disclosed.

12 Claims, 19 Drawing Sheets

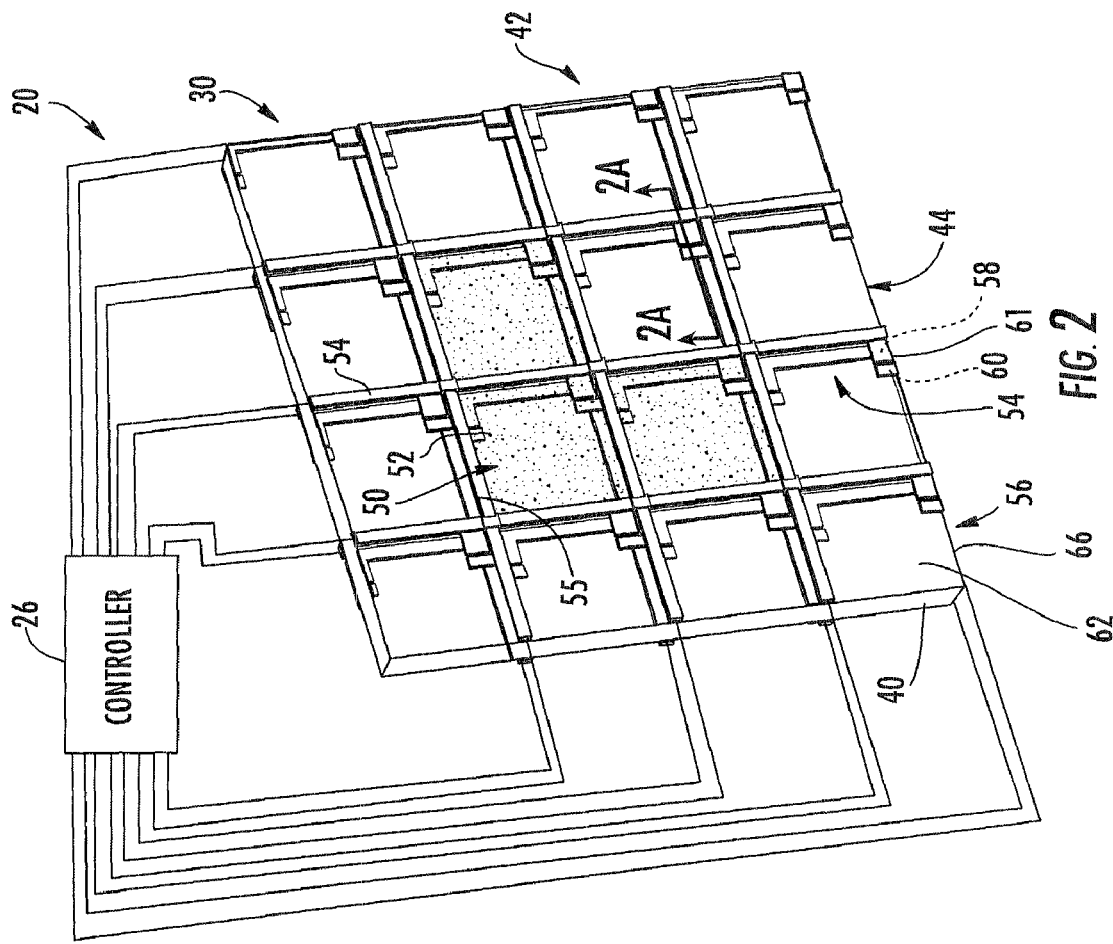
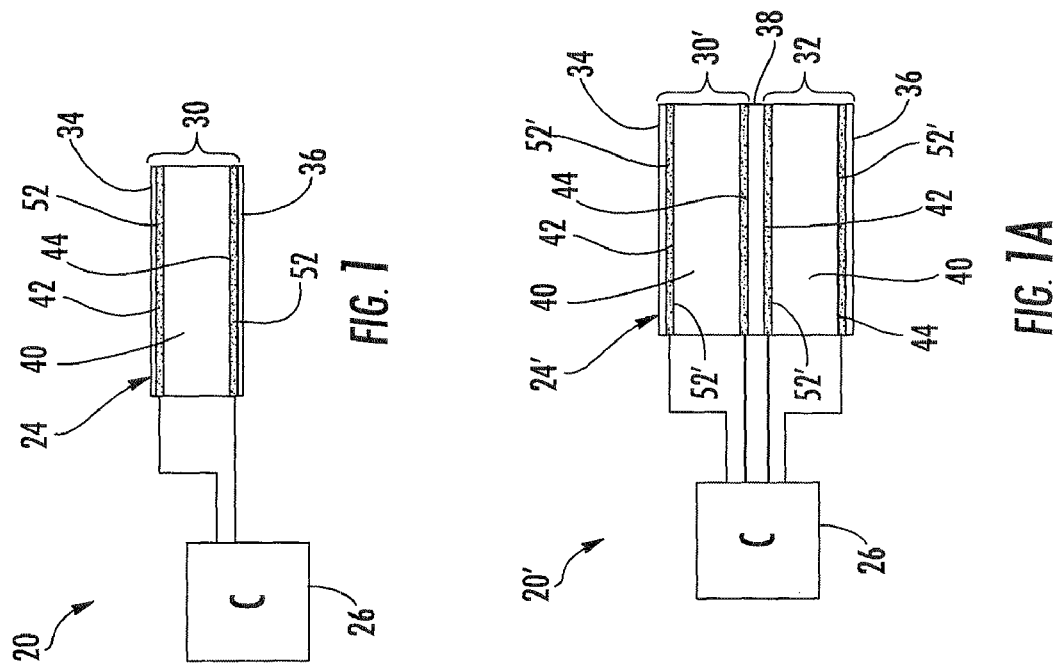

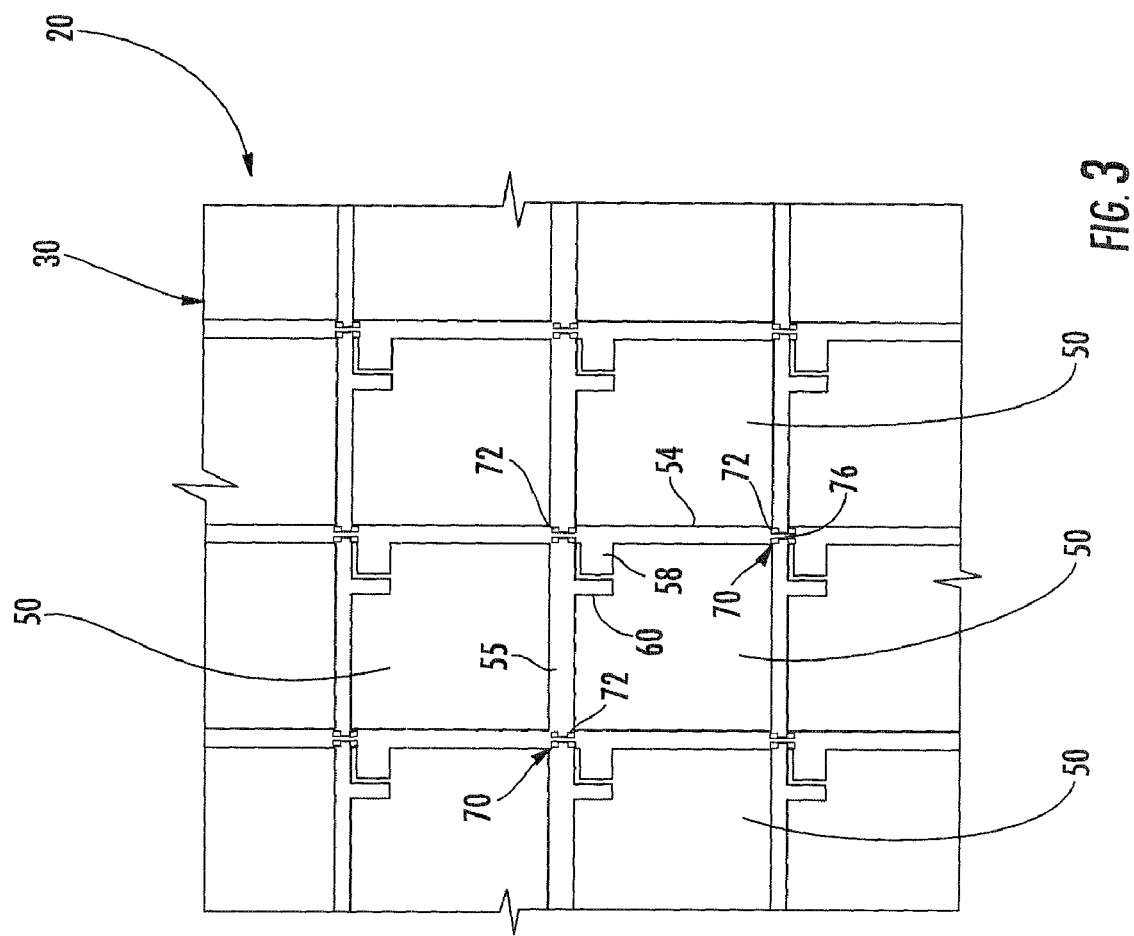

PIXEL WELL ELECTRODE

CROSS-REFERENCE TO RELATED PATENT APPLICATIONS

The present application is related to co-pending U.S. patent application Ser. No. 11/830,997 filed on the same day herewith by Alan R. Arthur and Ronald A. Hellekson and entitled PIXEL WELL ELECTRODES, the full disclosure of which is hereby incorporated by reference.

BACKGROUND

Displays and other devices may include pixels having wells containing electro-optical material. States of the electro-optical material are controlled by electrodes applying an electric field or charge to the material. Achieving satisfactory alignment of pixel wells and their electrodes may be difficult and expensive.

BRIEF DESCRIPTION OF THE DRAWINGS

FIG. 1 is a side elevational view of a display with portion schematically shown according to an example embodiment.

FIG. 1A is a side elevational view of another embodiment of the display of FIG. 1 with portion schematically shown according to an example embodiment.

FIG. 2 is a perspective view of a pixel stack of the display of FIG. 1 according to an example embodiment.

FIG. 3 is a sectional view of a pixel stack of FIG. 2 according to an example embodiment.

DETAILED DESCRIPTION OF THE EXAMPLE EMBODIMENTS

Figure 2A:
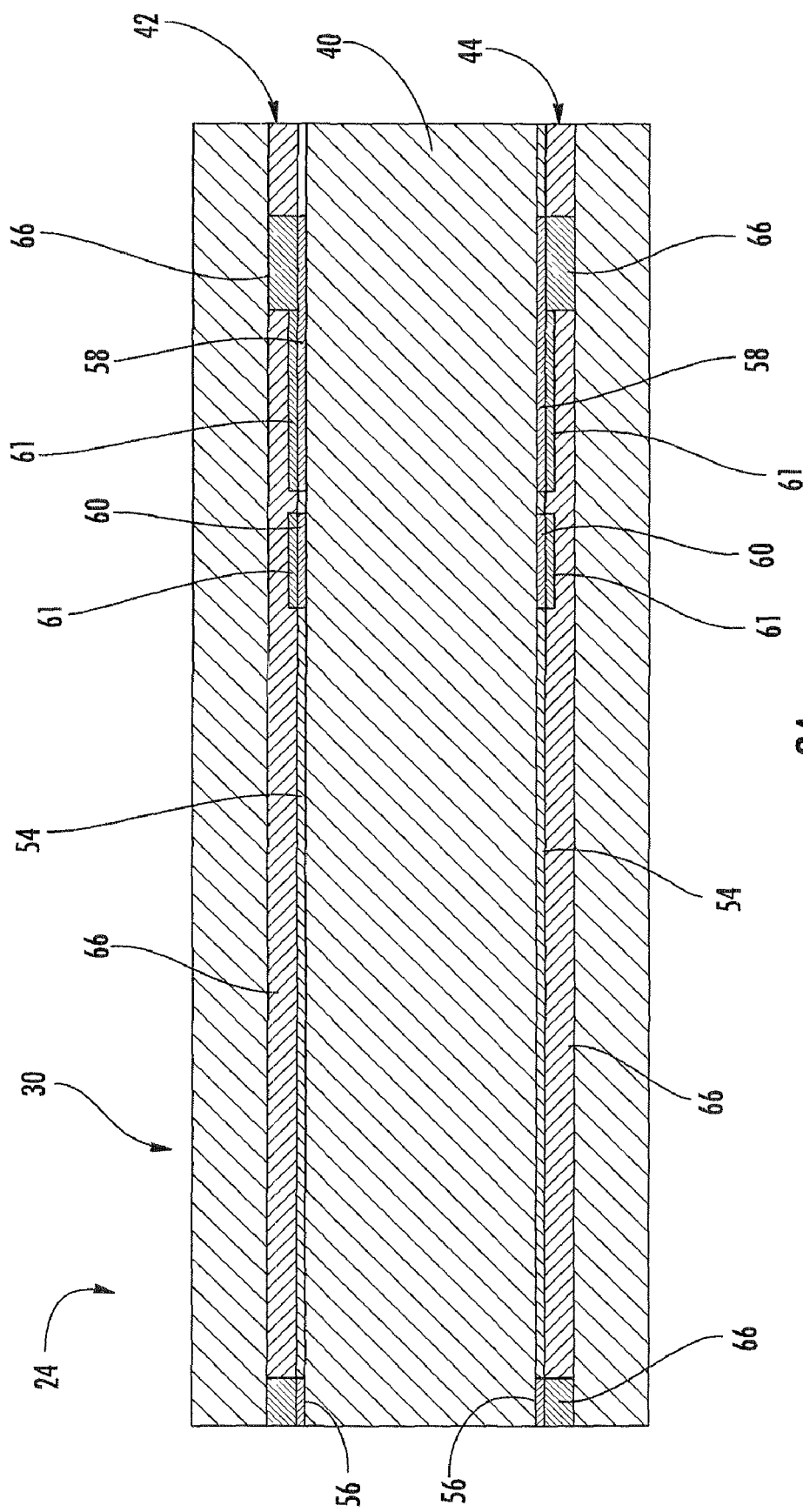
FIG. 2A is a sectional view of the pixel stack of FIG. 2 taken along lines 2A-2A according to an example embodiment.

FIG. 1 illustrates display 20 according to an example embodiment. Display 20 is a stacked display which includes display panel 24 and controller 26. Display panel 24 provides an image in response to control signals from controller 26. Display panel 24 provides a stacked arrangement or architecture of multiple pixels. As will be described hereafter, display panel 24 provides more precisely and accurately controlled positioning or locating of pixel features for enhanced performance.

Display panel 24 includes pixel stacks 30 and covers 34, 36. Pixel stacks 30, 32 each provide multiple layers of pixels and are stacked or overlapping with respect to one another. Pixel stack 30 includes substrate 40 and a pair of opposing pixel layers 42, 44. Substrate 40 comprises one or more layers which serve as a foundation, base or platform for supporting pixel layers 42 and 44. Substrate 40 is formed from one or more transparent dielectric materials. According to one embodiment, substrate 40 comprises a single layer of one or more transparent polymeric materials or plastics. In other embodiments, substrate 40 may be formed from other materials and may comprise more than one layer.

Pixel layers 42, 44 exist on opposite sides of substrate 40. Each pixel layer 42, 44 includes a matrix of multiple pixels 50 (shown in FIG. 2). Each pixel 50 includes an electro-optical material 52 that is configured to be selectively activated to distinct optical states. By selectively activating the electro-optical material 52 of certain pixels to selected states, different images may be formed or coloring of an image may be changed or controlled.

For example, in one embodiment, pixel layer 42 of stack 30 may include pixels 50 having an electro-optical material 52 actuable between a first colored state and second colored state or a combination of the two states. Pixel layer 44 of stack 30 may include pixels 50 having an electro-optical material 52 actuable between a third colored state and a fourth colored state or a combination of the two states. For example, in one embodiment, pixel layer 42 of stack 30 may include pixels 50 having an electro-optical material 52 actuable between a red or cyan colored state and a green or magenta colored state. Pixel layer 44 of stack 30 may include pixels 50 having an electro-optical material 52 actuatable between a blue or yellow colored state and a black state. In such an embodiment, pixel layers 42 and 44 provide four color planes of a color image. Examples of electro-optical material include, but are not limited to, dyed or undyed polymer dispersed liquid crystal, dispersions or solutions of charge particles or pigments, or electrochromatic materials.

Covers 34, 36 comprise one or more layers of one or more materials overlying pixel layer 42 and pixel layer 44 of stacks 30 and 32, respectively. In one embodiment, covers 34 and 36 protect pixel layers 42 and 44 of stacks 30 and 32, respectively, from damage. In one embodiment, covers 34, 36 additionally assist in containing and retaining the electro-optical material 52 in place. In one embodiment, covers 34, 36 additionally or alternatively serve an optical function. For example, in one embodiment, one or both of covers 34, 36 may be tinted or may be configured to reduce glare. In one embodiment, both covers 34, 36 may be transmissive.

In yet another embodiment, such as where display panel 24 is a reflective display panel, one of covers 34, 36 may be reflective while the other of covers 34, 36 is transmissive (transparent or translucent). In one embodiment, the reflective cover 34, 36 may provide a lambertion diffusive reflection or may be more specular. The reflective cover 34, 36 may be appropriately configured to apply optical gain to counter diffusion of light through the electro-optical material 52. In particular embodiments, the reflective cover 34, 36 and a transmissive cover 34, 36 may be configured to cooperate with one another to receive and reflect light originating from certain angles or directions with respect to panel 24 to a greater or lesser extent as compared to light originating from other angles or directions with respect to panel 24. In other embodiments, covers 34, 36 may be omitted.

Controller 26 comprises one or more processing units configured to generate electrical control signals for selectively actuating electro-optical material 52 of individual pixels 50 in pixel layers 42 and 44 of pixel stacks 30 and 32. As schematically represented in FIG. 1, controller 26 is electrically connected to pixels 50 of each pixel layer 42, 44 of stacks 30, 32. The electrical signals transmitted to each pixel 50 result in an electrical charge or field being applied to the electro-optical material 52 within each pixel 50 to selectively actuate each pixel 50.

For purposes of this application, the term "processing unit" shall mean a presently developed or future developed processing unit that executes sequences of instructions (such as video or display driver instructions) contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 26 may be embodied as part of one or more application-specific integrated circuits (ASICs). Unless otherwise specifically noted, the controller is not limited to any specific combination of hardware circuitry and software, nor to any particular source for the instructions executed by the processing unit.

FIG. 1A schematically illustrates display 20', another embodiment of display 20. Display 20' is similar to display 20 except that display 20' includes pixel stack 30' in lieu of pixel stack 30 and additionally includes pixel stack 32 and spacer 38. Those remaining elements of display 20' which correspond to display 20 are numbered similarly.

Pixel stack 30' is stack is substantially identical to pixel stack 30 except that pixel stack 30' includes electro-optical material 52' in lieu of electro-optical material 52. Pixel stack 32 is substantially identical to pixel stack 32 and is separated from stack 30' by spacer 38. Both pixel stacks 30', 32 include electro-optical material 52.

Like electro-optical material 52, electro-optical material 52', comprises one or more charge responsive optical materials configured to change between different optical states in response to an applied electrical field or electrical charge applied by electrodes 58, 60. However, unlike electro-optical material 52, electro-optical material 52' is configured to change between a transparent or translucent state and an opaque state in response to an applied electrical field or electrical charge. In one embodiment, pixel layer 42 of stack 30' may include pixels 50 having an electro-optical material 52' actuable between a transparent or translucent state and a cyan or red colored state. Pixel layer 44 of stack 30' may include pixels 50 having an electro-optical material 52' actuable between a transparent or translucent state and a magenta or blue colored state. Pixel layer 44 of stack 32 may include pixels 50 having an electro-optical material 52' actuable between a transparent or translucent state and a yellow or green colored state. Pixel layer 44 of stack 32 may include pixels 50 having an electro-optical material 52' actuable between a transparent or translucent state and a black state. By selectively actuating pixels 50 of layers 42 and 44 of stacks 30' and 32, different colored images may be provided. Examples of electro-optical material include, but are not limited to, dyed or undyed polymer dispersed liquid crystal, dispersions or solutions of charge particles or pigments, or electrochromatic materials. In yet other embodiments, electro-optical material 52' may the be same as electro-optical material 52.

Spacer 38 comprises one or more layers of one or more materials sandwiched between pixel stacks 30' and 32. The spacer 38 is transmissive and spaces stacks 30' and 32 apart from one another. In the example illustrated, spacer 38 additionally serves as a cover for pixel layers 44 and 42 of stacks 30' and 32, respectively. Serving as a cover, spacer 38 may assist in containing and retaining the electro-optical material 52 in place. In one embodiment, spacer 38 may additionally or alternatively serve an optical function. In other embodiments, spacer 38 may be omitted.

In other embodiments, display panel 24' may include greater or fewer of such stacks 30', 32 providing greater or fewer color or optical combinations. For example, in one embodiment, display panel 24 may have a greater number of stacks 30', 32 providing a greater number of pixel layers 42, 44, wherein additional shades of color (such as, light cyan, light magenta, light yellow, dark cyan, dark magenta, dark yellow) may be selected.

FIGS. 2 and 2A illustrate pixel stack 30 of display 20 in more detail. As noted above, pixel stacks 30' and 32 are similar to pixel stack 30 but for electro-optical material 52'. As noted above, pixel stack 30 includes a transmissive substrate 40 and pixel layers 42 (shown on a front side in FIG. 2) and 44 (visible on a backside through substrate 40 in FIG. 2). Pixel layers 42 and 44 each include a matrix of pixels 50 and a grid of conductor lines 54, 55.

As further shown by FIGS. 2 and 2A, each pixel 50 includes a pixel well 56, electro-optical material 52 and electrodes 58, 60. Each pixel well 56 comprises a depression or basin configured to receive and contain electro-optical material 52. Each pixel well 56 includes a floor 62 and side walls 66. Floor 62 and sidewalls 66 have surfaces of dielectric material. In the example illustrated, floor 62 is provided by substrate 40 while sidewall 66 is provided by one or more dielectric materials overlying the grid of conductor lines 54, 55. According to one embodiment, pixel wells 56 in pixel layer 42 are substantially aligned with opposing pixel wells 56 in layer 44 which face in an opposite direction. In other words, side walls 66 in pixel layer 42 are directly opposite to sidewalls 66 in pixel layer 44. In one embodiment, side walls 66 in layers 42, 44 have substantially equal dimensions so as to coextensively extend on opposite sides of substrate 40. In other embodiments, pixel wells 56 in pixel layer 42 may have other locations or relative positions with respect to pixel wells 56 in pixel layer 44.

Electrodes 58, 60 comprise pads, terminals or other structures of one or more electrically conductive materials extending within each pixel well 56 and electrically connected to the grid of conductor lines 54, 55. As shown in FIG. 2A, electrodes 58, 60 have faces covered with a dielectric coating or layer 61. In other embodiments, this layer 61 may be removed or omitted. Electrodes 58 are connected to conductor lines 54 while electrodes 60 are connected to conductor lines 55. Electrodes 58, 60 are configured to have a different charge or to be placed at a distinct electrical potential so as to apply an electrical field or charge to the electro-optical material 52 within their associated pixel well 56.

In the example illustrated, electrodes 58, 60 extend adjacent to and along floor 62 of the associated pixel well 56. In the example illustrated, electrodes 58, 60 are substantially coplanar with one another and have substantially the same thicknesses while projecting from the floor 62 by substantially equal distances. As will be described hereafter, according one example embodiment, electrodes 58, 60 are further substantially coplanar with one another and have the same thickness and height above the floor 62 as conductor lines 54, 55. In one embodiment, electrodes 58, 60 and the conductor lines 54, 55 are integrally formed as part of a single unitary body from a common previously applied layer of electrically conductive material, wherein portions of the layer are removed to form the conductor lines 54, 55 and electrodes 58, 60.

Overall, electrodes 58, 60 and conductor lines 54, 55 are more easily formed. Because electrodes 58, 60 and conductor lines 54, 55 are coplanar, the overall thickness of pixel layers 42 and 44 may be reduced. Because conductor lines 54, 55 serve as an initial location defining foundation for sidewalls 66 and are also integrally formed as part of a single unitary body and from a single layer as electrodes 58, 60, the positioning of electrodes 58, 60 and sidewalls 66 may be more precisely and accurately controlled with less complex and/or fewer fabrication steps, reducing cost.

Figure 4:
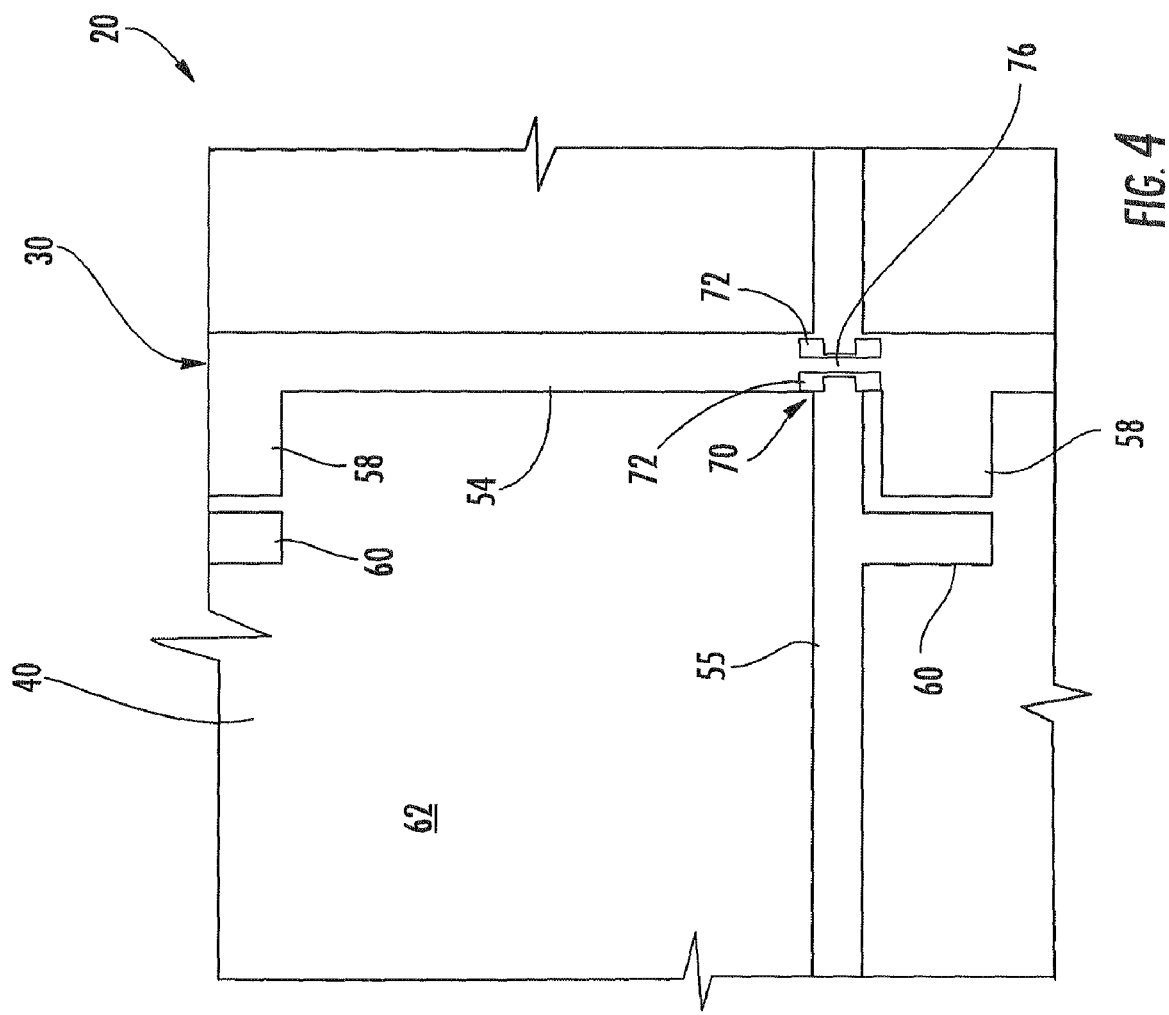
FIG. 4 is an enlarged sectional view of the pixel stack of FIG. 3 according to an example embodiment.

Conductor lines 54, 55 transmit electrical charge voltage to electrodes 58 and 60, respectively. As shown by FIG. 2, each of conductor lines 54, 55 is electrically coupled to controller 26 (described above with respect to FIG. 1). FIGS. 3-7 illustrate conductor lines 54, 55 in more detail. FIGS. 3 and 4 are sectional views through substrate 40 illustrating a bottom side of pixel layer 44. As shown by FIGS. 3 and 4, conductor lines 54 are integrally formed as part of a single unitary body with electrodes 58. Similarly, conductor lines 55 are integrally formed as part of a single unitary body with electrodes 60. Conductor lines 54 and 55 also serve as a foundation for sidewalls 66. In other embodiments, conductor lines 54 and 55 may form an intermediate layer building up a height of sidewalls 66. In some embodiments, conductor lines 54, 55 may be electrically insulated from adjacent portions of wells 56 by a conformal dielectric overcoat (not shown).

As shown by FIG. 4, conductor lines 54 and 55 form a grid or matrix of electrically conductive lines that intersect one another at junctions 70. Each junction 70 includes one or more dielectric barriers 72 and an electrically conductive crossover bridge 74 (shown in FIG. 7). Dielectric barriers 72 electrically insulate or isolate conductor lines 54 and 55 at junctions 70. As shown by FIG. 4, dielectric barriers 72 are located on opposite sides of conductor line 54 between conductor line 54 and conductor line 55. Barriers 72 are spaced from one another such that conductor line 54 has a cross under portion 76. Cross under portion 76 extends between barriers 72 and electrically interconnects portions of conductor lines 54 that extend adjacent to consecutive pixels 50 and that extend on opposite sides of conductor line 55.

Figure 5:
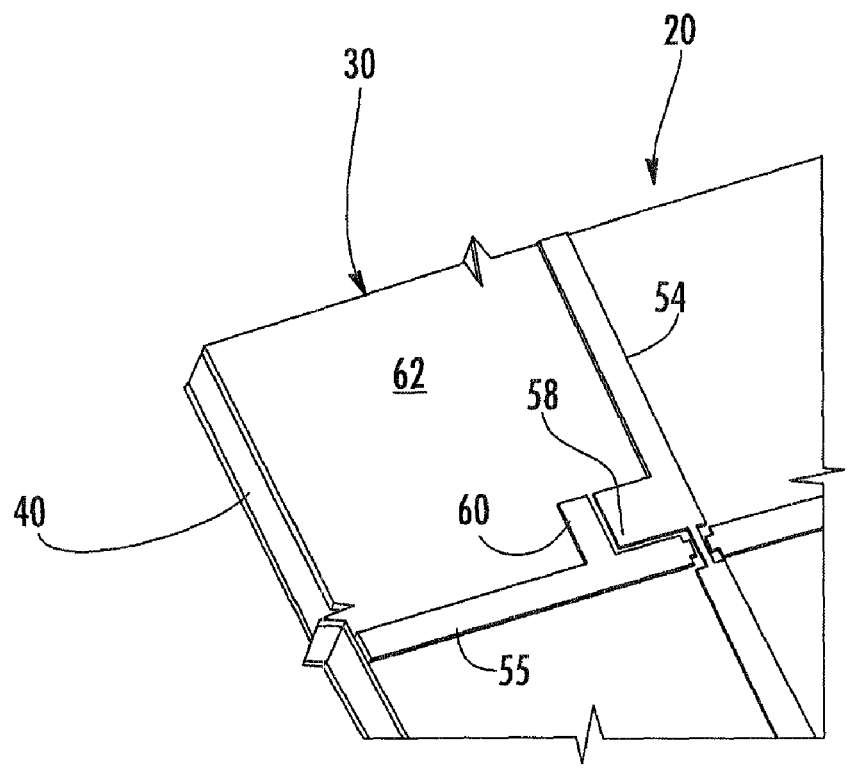
FIG. 5 is a top perspective view of a portion of a pixel stack of FIG. 2 with portions omitted for purposes of illustration according to an example embodiment.
Figure 6:
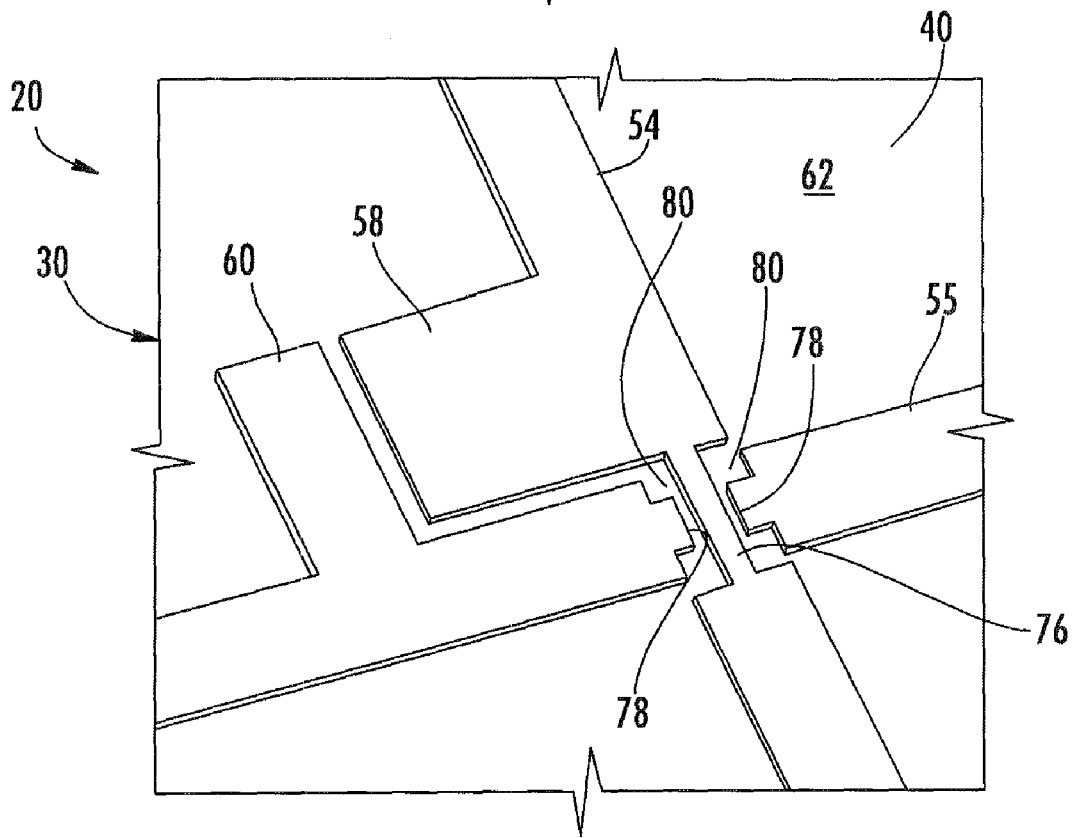
FIG. 6 is an enlarged perspective view of the pixel stack of FIG. 5 according to an example embodiment.

FIGS. 5 and 6 illustrate cross under portion 76 in more detail. FIGS. 5 and 6 illustrate portions of a top side of pixel layer 44 without barriers 72, without bridge 74 and without the one or more dielectric materials that extend above and about conductor lines 54 and 55 to form sidewalls 66 (shown in FIG. 2). As shown by FIGS. 5 and 6, in the example embodiment illustrated, conductor line 55 terminates at spaced locations on opposite sides of cross under portion 76, permitting cross under portion 76 to continuously extend between such terminal end portions 78 of conductor line 55. As shown by FIG. 4, barriers 72 fill in the space between cross under portion 76 and end portions 78 to further electrically separate cross under portion 76 from conductor line 55.

Figure 7:
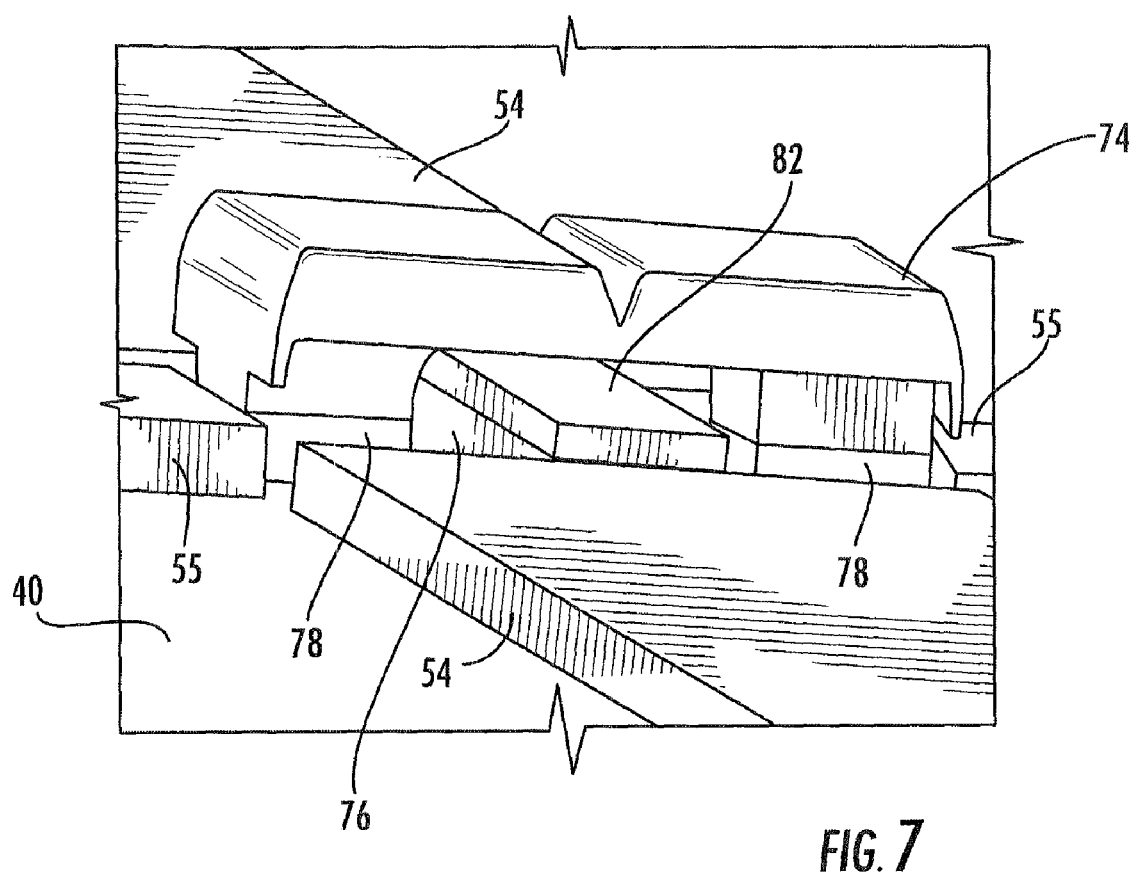
FIG. 7 is a fragmentary top perspective view of a juncture of the pixel stack of FIG. 2 with portions omitted for purposes of illustration according to an example embodiment.

FIG. 7 illustrates crossover bridge 74 without barriers 72 and without the one or more dielectric materials that extend above and about conductor lines 54 and 55 to form a sidewalls 66. As shown by FIG. 7, crossover bridge 74 comprises an inverted U-shaped structure of one or more layers of one or more electrically conductive materials that span cross under portion 76 and interconnect end portions 78 of conductor line 55. Bridge 74 is spaced from conductor line 54 and cross under portion 76 by side gaps 80 and top gap 82. In the example illustrated, barriers 72 further extend over cross under portion 76 within top gap 82 and within side gaps 80 to further electrically separate bridge 74 from conductor line 54. In one embodiment, barriers 72 bridge over cross under portion 76. The resulting architecture at junctions 70 facilitates fabrication of conductor lines 54 and 55 from a single continuous blanket layer of conductive material in a single plane, simplifying and reducing the cost of fabrication. In addition, the architecture of junctions 70 provides a robust and effective junction that itself may be more easily fabricated.

Figure 8:
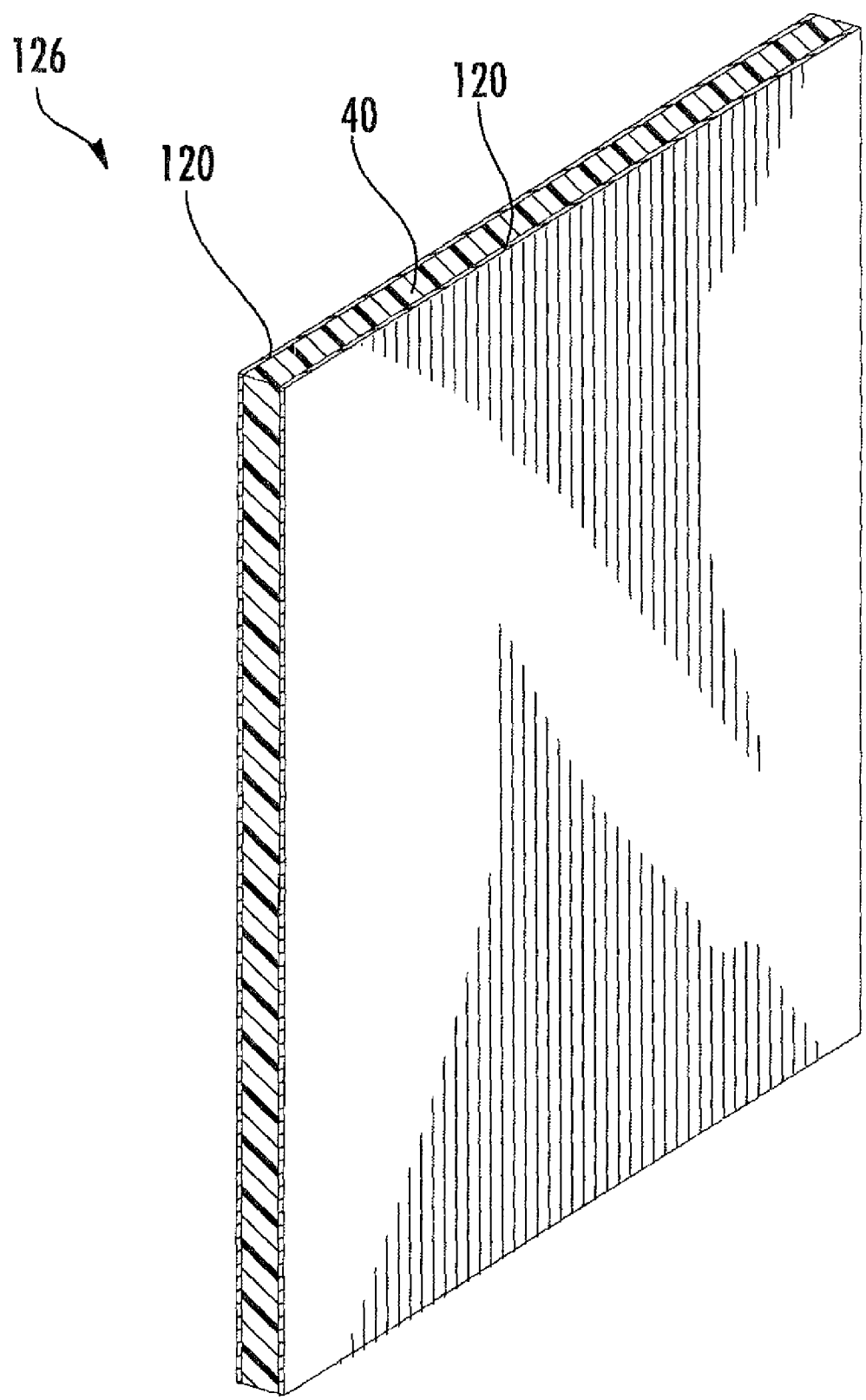
FIG. 8 is a top perspective view of a panel including blanket conductive layers for use in an example method for forming the pixel stack of FIG. 2 according to an example embodiment.

FIGS. 8-21 illustrate one example method or process for forming pixel stack 30 (or pixel stack 32). As shown by FIG. 8, continuous uninterrupted layers or blankets 120 of electrically conductive material are formed over and on opposite sides of substrate 40 (described above with respect FIG. 2). In one embodiment, the electrically conductive material of blankets 120 comprises a selectively etchable material. In one embodiment, the electrically conductive material may be opaque. According to one embodiment, the electrically conductive material comprises Nickel. In other embodiments, the electrically conductive material may comprise other electrically conductive materials. In one embodiment, blankets 120 are formed by sputtering. In other embodiments, blankets 120 are formed by other blanket coating or lamination techniques. Although blankets 120 are illustrated as being directly formed upon and in contact with substrate 40, in other embodiments, blankets 120 may alternatively be formed upon other intermediate transparent layers of dielectric material supported by substrate 40.

Figure 9:
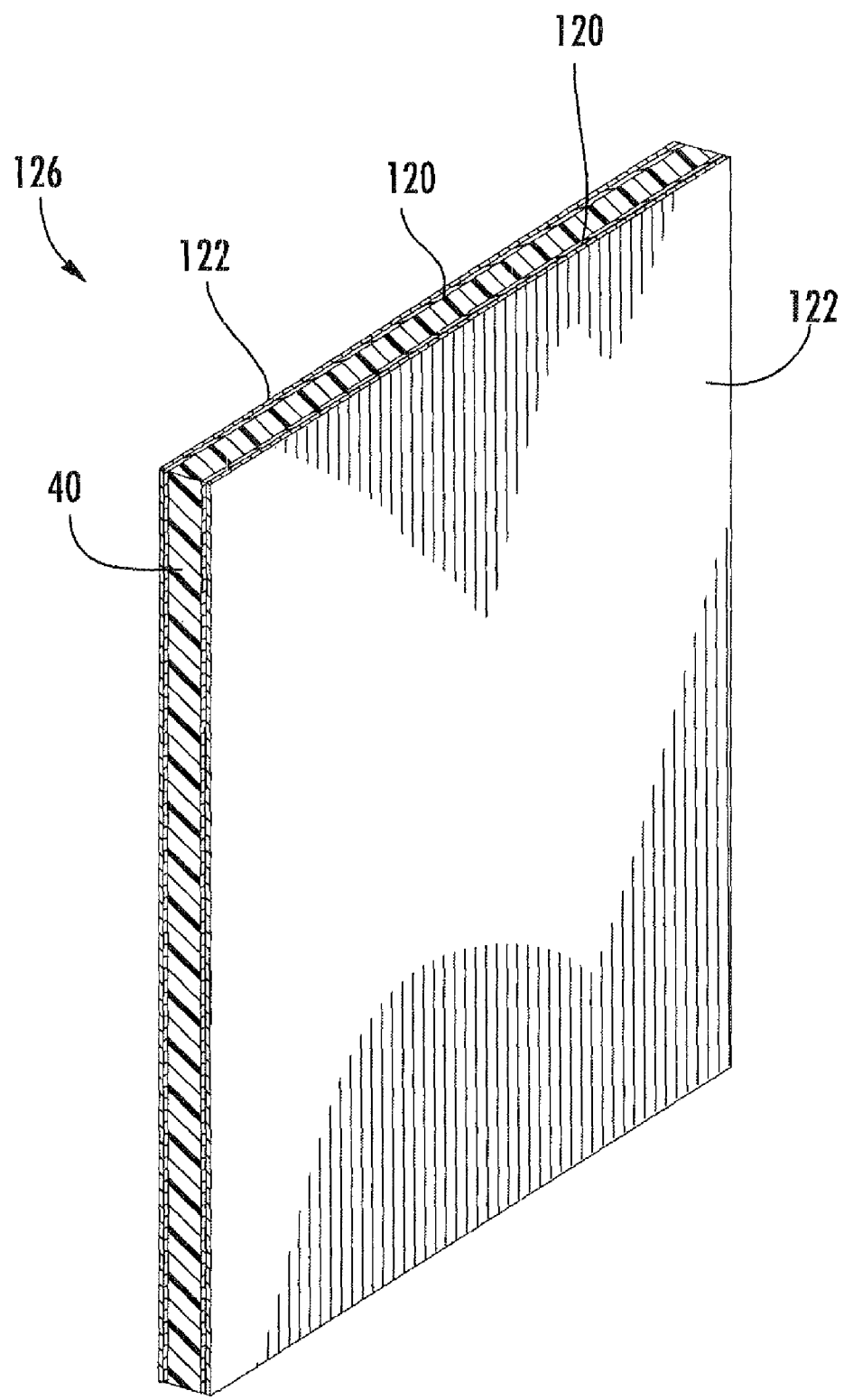
FIG. 9 is a top perspective view of the panel of FIG. 8 further including embossable layers according to an example embodiment.

As shown by FIG. 9, continuous and uninterrupted layers 122 of one or more embossable materials are formed over and on opposite sides of substrate 40 and on opposite sides of blankets 120. In one embodiment, the embossable material of layers 122 comprises an ultraviolet curable resin. According to one embodiment, the embossable material comprises Norlean Optical Adhesive #83H. In other embodiments, the embossable material may comprise other embossable materials. In one embodiment, layers 122 may be formed by micro-gravure coating. In other embodiments, layers 122 are formed by other blanket coating techniques. Although layers 122 are illustrated as being directly formed upon any contact with blankets 120, in other embodiments, layers 122 may alternatively be formed upon other intermediate transparent layers of dielectric material supported by blankets 120.

Figure 10:
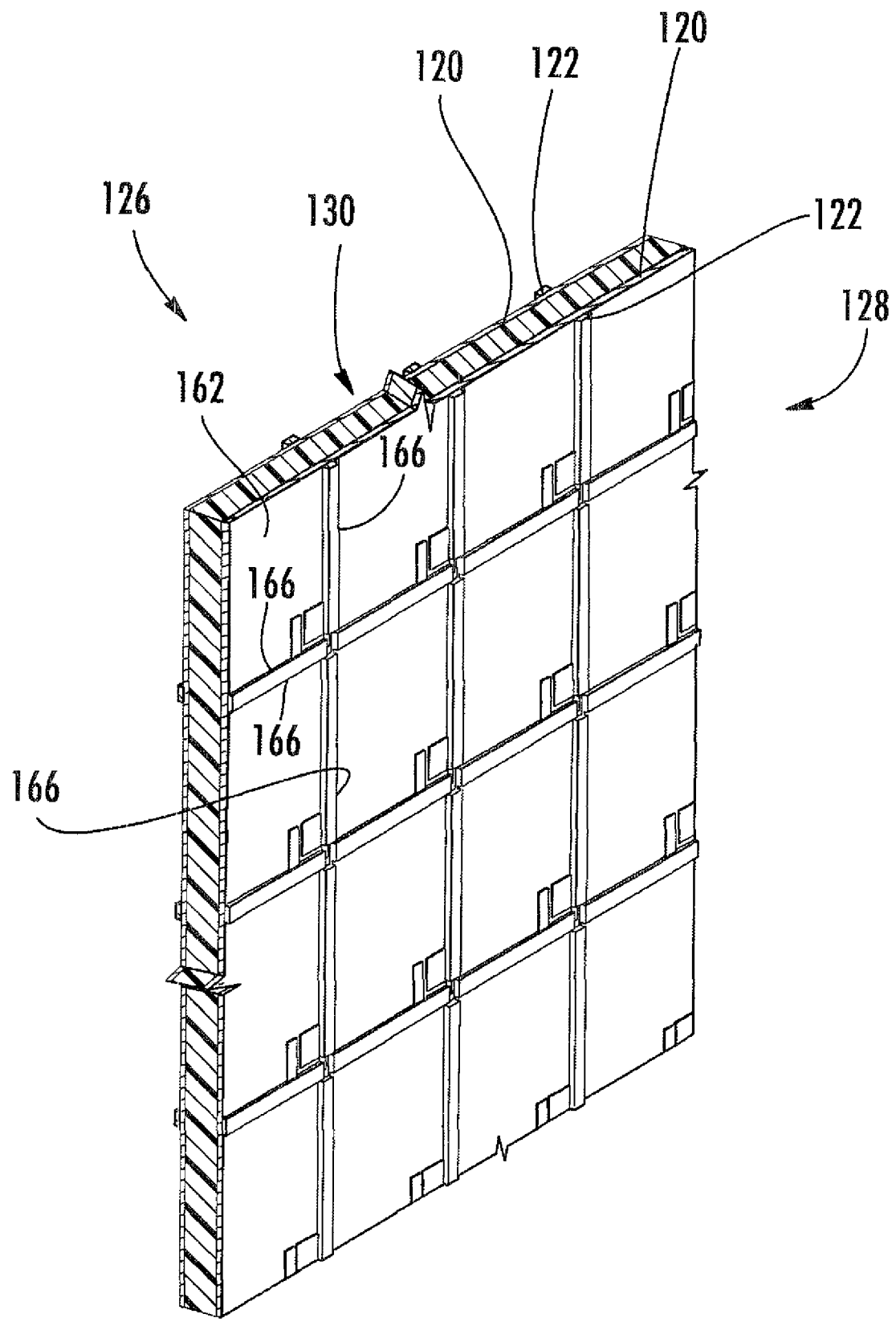
FIG. 10 is a top perspective view illustrating the panel of FIG. 9 after embossment of the embossable layers according to an example embodiment.

As shown by FIG. 10, the resulting panel 126 comprising substrate 40 sandwiched between blankets 120 of conductive material and opposite layers 122 of embossable material is concurrently embossed on both sides 128, 130 with multilevel embossing stamps. In one embodiment, the embossing stamps on opposite sides 128, 130 of panel 126 are x-y axes feature aligned with one another. In other words, the pattern of features (projections and recesses) along the x-y axes along the plane or face of the opposing stamps are aligned with one other in both the x-axis direction and the y-axis direction such that the embossed patterns will be directly opposite to one another. For example, surfaces perpendicular to substrate 40 of features on opposite sides of substrate 40 will be coplanar in the z-axis direction. The opposite embossing stamps are positioned so as to face one another and are concurrently moved towards one another to concurrently emboss both layers 122. In one embodiment, such embossment is to a stop provided on blankets 120. After sufficient solidification or curing of layers 122, the opposing stamps are withdrawn.

In one embodiment where the embossable material comprises a UV curable resin, such embossing stamps (not shown) may comprise etched quartz or other UV passing or transmissive material. While in embossing contact with layers 122, ultraviolet light is transmitted through the stamps to cure the material of layers 122. After sufficient cure, the multi-level stamps are removed and separated from panel 126. In other embodiments, where the embossable material comprises other materials, the multi-level stamps may be formed from other materials, wherein curing or other solidification of layers 122 is achieved in other fashions.

Figure 11:
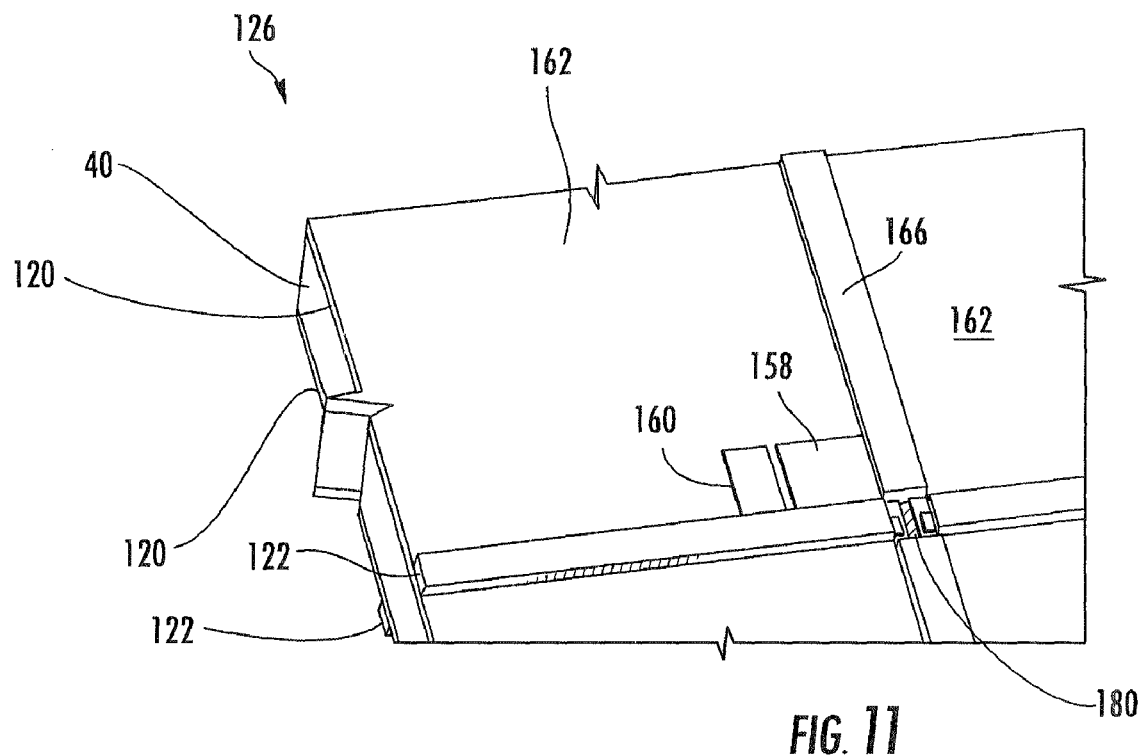
FIG. 11 is an enlarged fragmentary perspective view of a portion of the embossed panel of FIG. 10 according to an example embodiment.
Figure 12:
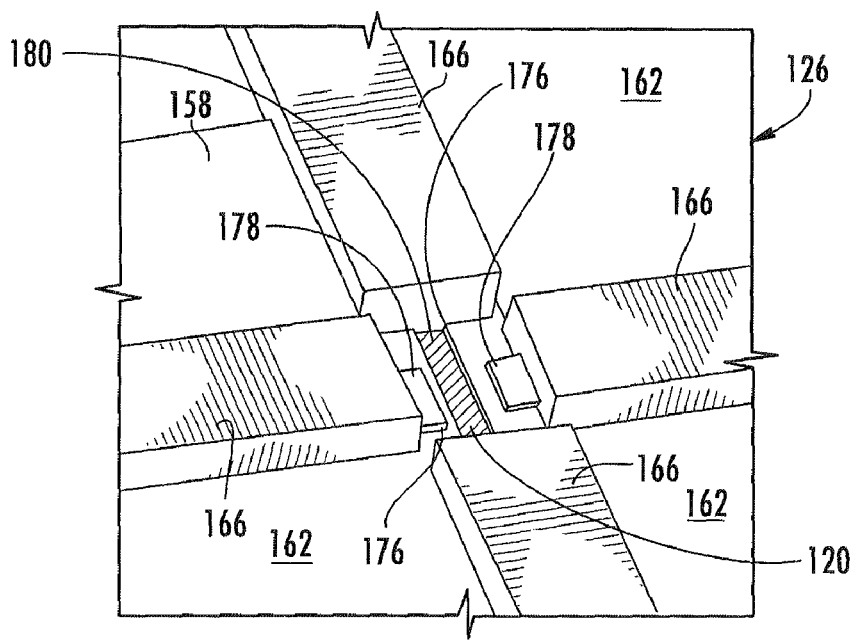
FIGS. 12-19 are enlarged perspective views of the panel of FIG. 11 illustrating an example method of forming a junction on the panel according to an example embodiment.

As further shown by FIG. 10, the concurrent embossment of sides 128, 130 of panel 126 forms multiple features in layers 122 over blankets 120 which correspond to floors 62 and sidewalls 66 of pixel wells 56 and which also correspond to the ultimate locations of electrodes 58 and 60 (shown in FIG. 2). As will be described hereafter, such features also correspond to portions of junctures 70 (shown in FIGS. 3-7). The embossed features locate and define the subsequent locations and dimensions or geometries of floors 62, sidewalls 66, electrodes 58, 60 and junctures 70. In particular, embossed features 158 and 160 correspond in shape, location and size to electrodes 58 and 60, respectively. Embossed features 162 correspond in shape, location and size to floors 62. Embossed features 166 form sidewalls 66. As shown in FIGS. 11 and 12, embossed features 176 serve as a mask for defining subsequently formed cross under portion 76 (shown in FIG. 6). Embossed features 178 correspond in size, location and shape to interconnect end portion 78 (shown in FIG. 6).

Because, in one embodiment, sides 126, 128 are concurrently embossed with x-y feature aligned stamps, the pixel wells 56, including their floors 62 and sidewalls 66 as well as electrodes 58, 60 on opposite sides of substrate 40, will be aligned. Because the pixel wells 56, including their floors 62 and sidewalls 66 as well as electrodes 58, 60 on opposite sides of substrate 40 (the final structures) are concurrently located and aligned with one another during the initial fabrication of stack 30, such final structures may be more accurately and precisely aligned without creep or misalignment issues that sometimes arise when the location of such final structures is defined with processing steps performed at different times. Such misalignment issues may be otherwise especially prevalent when substrate 40 comprises a polymer or plastic which may have less dimensional stability as compared to other materials. Enhanced alignment of pixel wells 56 and electrodes 58, 60 results in enhanced performance of stack 30 and of display 20 (shown in FIG. 1).

FIGS. 11-18 illustrate one method for further forming junction 70. Although a single junction in a single pixel layer is described, junctions across the pixel layer and on an opposite pixel layer of the pixel stack are similarly formed. FIG. 11 illustrate junctions 70 just after embossing. As noted above, the embossment of layers 122 uses portions of blankets 120 as a stop. In the example illustrated, the area 180 between features 176 serve as a stop for one of the multilevel stamps. However, as shown in FIG. 12, any remaining portion of layer 122 over area 180, obscuring a full footprint of the subsequent cross under portion 76, is removed. According to one embodiment, any remaining materials of layer 122 in area 180 over the underlying portion of blanket 120 is removed by an anisotropic dry etch such as with an oxygen plasma etch or other etching techniques.

Figure 13:
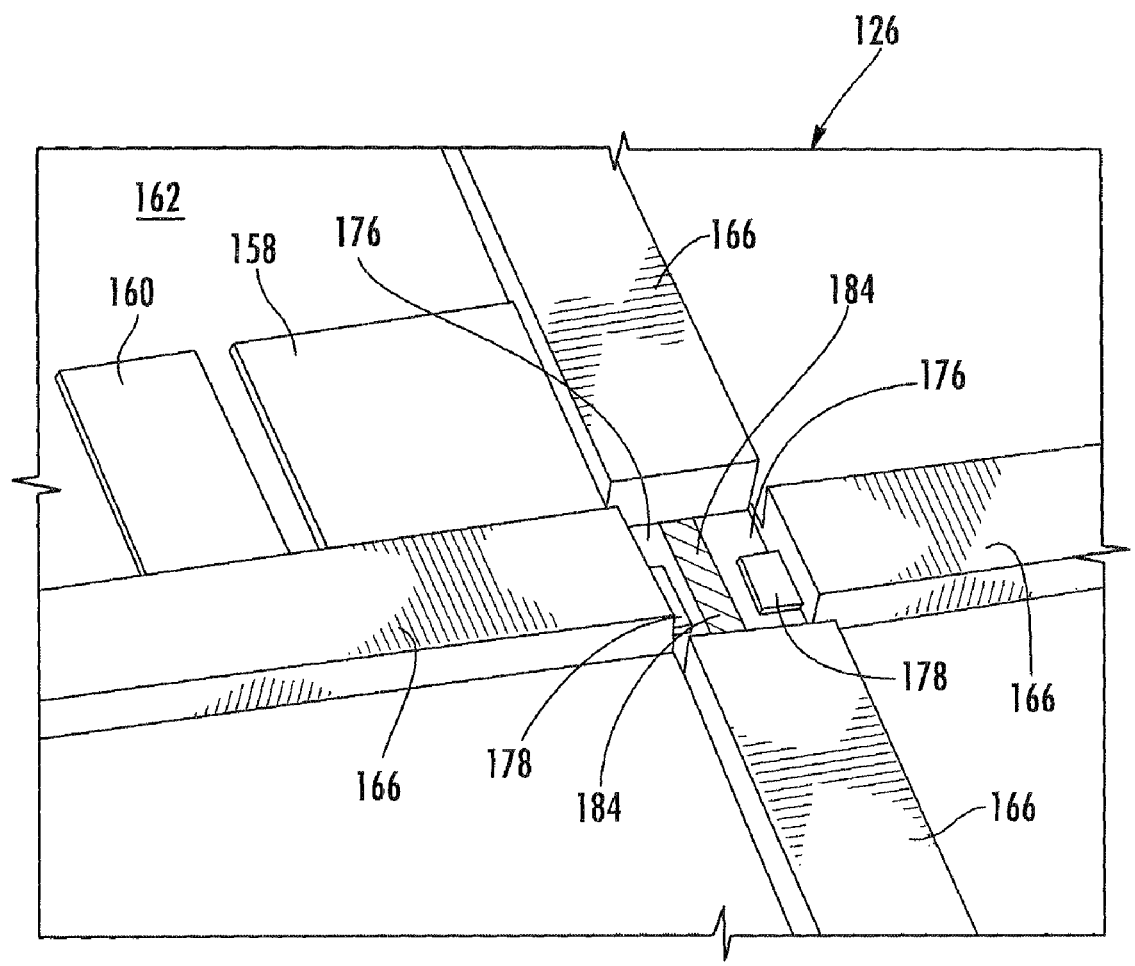

As shown in FIG. 13, a layer 184 of one more materials that are electrically conductive but which are substantially immune to removal processes or materials which will be used to subsequently remove of blanket 120 are applied or deposited on top of the area 180 of the exposed blanket 120 (shown in FIG. 12) between embossed features 176. According to one embodiment, layer 184 is deposited by electrophoresis or electroplating. As a result, photolithography steps may be omitted. In other embodiments, layer 184 may be formed and defined by other methods.

Figure 14:
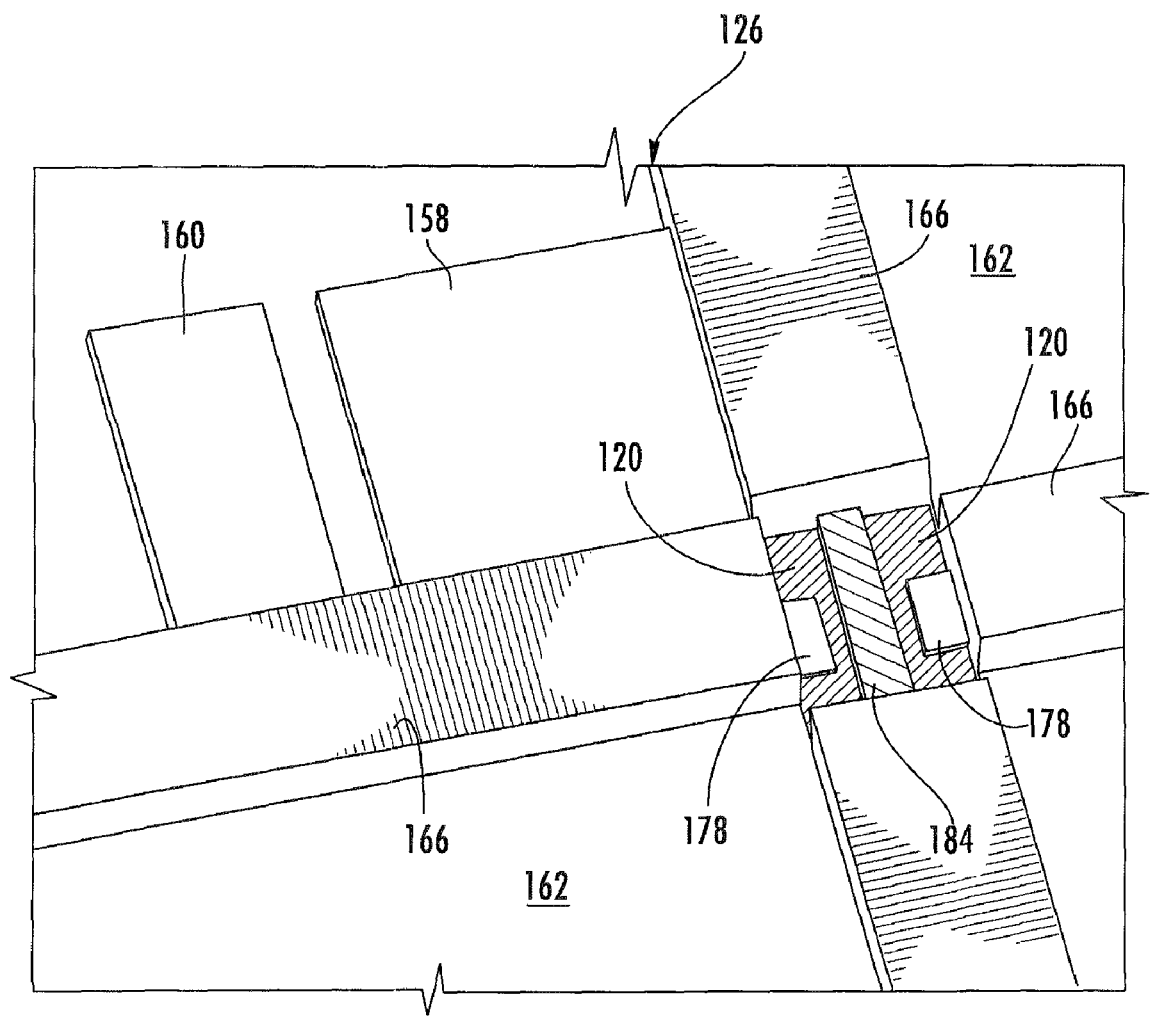

As shown by FIG. 14, embossed features 176 are removed to expose the underlying portions of blanket 120. According to one embodiment, embossed features 176 are removed with an anisotropic dry etch. In other embodiments, embossed features 176 may be removed by other methods.

Figure 15:
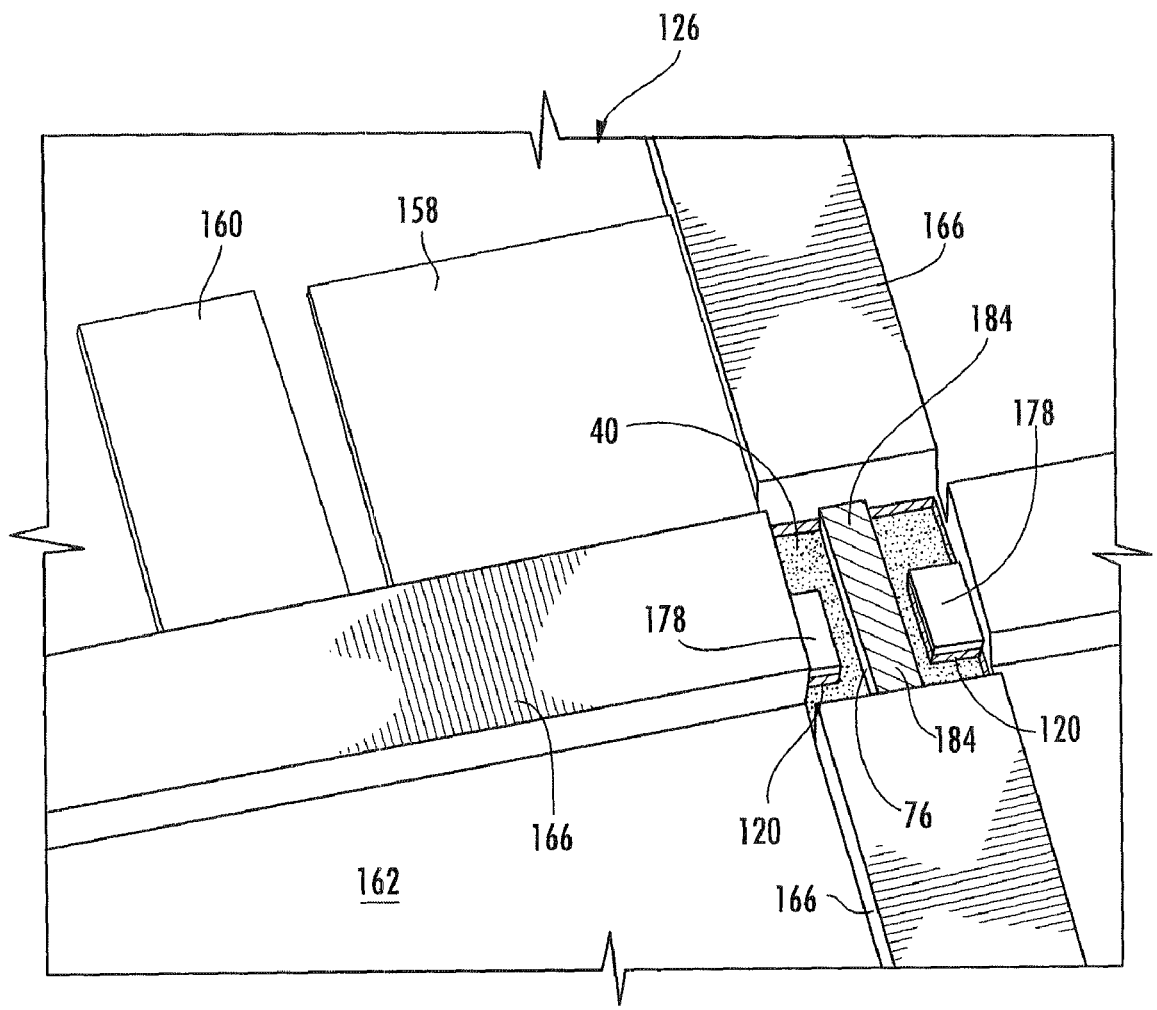

As shown in FIG. 15, portions of blanket 120 which previously underlied embossed features 176 are removed. As shown in FIG. 15, layer 184 is immune to the process or materials used to remove the particular portions of blanket 120. As a result, those portions of blanket 120 underlying layer 184 are protected and remain to serve as cross under portion 76. According to one embodiment, those portions of blanket 120 underlying the previous embossed features 176 are removed with a wet etch, wherein the material of layer 184 is unetched by the wet etching solution. In other embodiments, portions of blanket 120 underlying previous embossed features 176 may be removed in other manners. In other embodiments, embossed features 176 and the underlying portions of blanket 120 may be removed in a single process.

Figure 16:
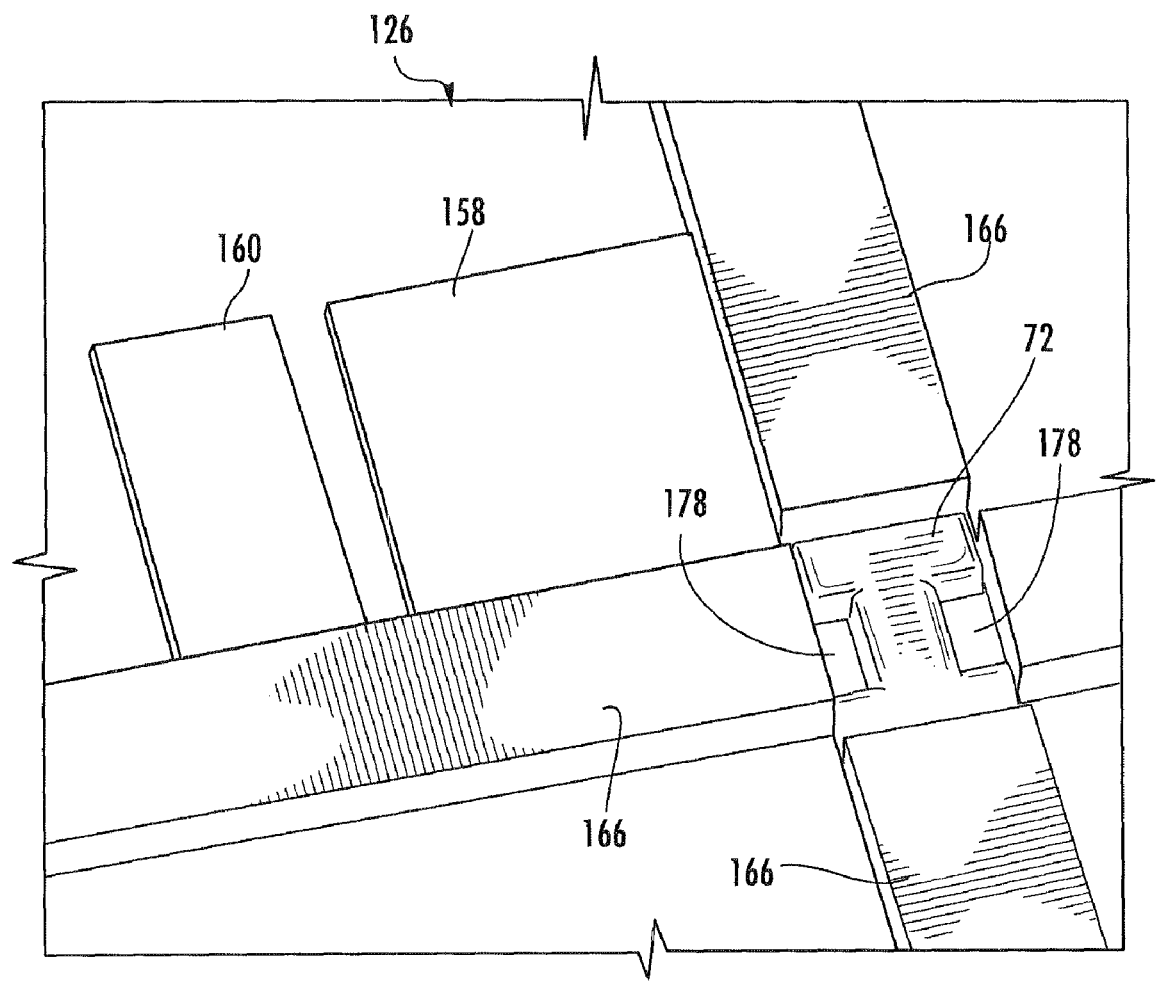

As shown in FIG. 16, barriers 72 are formed. In particular, barriers 72 are formed by electrophoretically depositing or a dielectric material or a dielectric capable material, that is subsequently made dielectric, upon the electrically conductive material of layer 184 and to the exposed edges of blanket 120. According to one embodiment, a dielectric material may comprise a dielectric polymer, such as Shipley Eagle 2100ED or similar, wherein charged particles of the polymer are attracted to the charged electrically conductive materials of layers 184 and blanket 120. According to another embodiment, a dielectric capable material, such as a PEDOT:PSS polymer mixture, is electrodeposited and subsequently made a dielectric through oxidation. Because barriers 72 are formed by electrophoresis, the number of photolithography steps are reduced, reducing fabrication cost and complexity.

In other embodiments, barriers 72 may be formed by other methods other than electro-deposition. In such embodiments, layer 184 (shown in FIG. 15) may comprise one or more dielectric materials immune to the process solution used to remove blanket 120. For example, layer 184 may itself comprise an electrophoretically deposited polymer, wherein charged particles of the polymer are attracted to charge applied to blanket 120.

Figure 17:
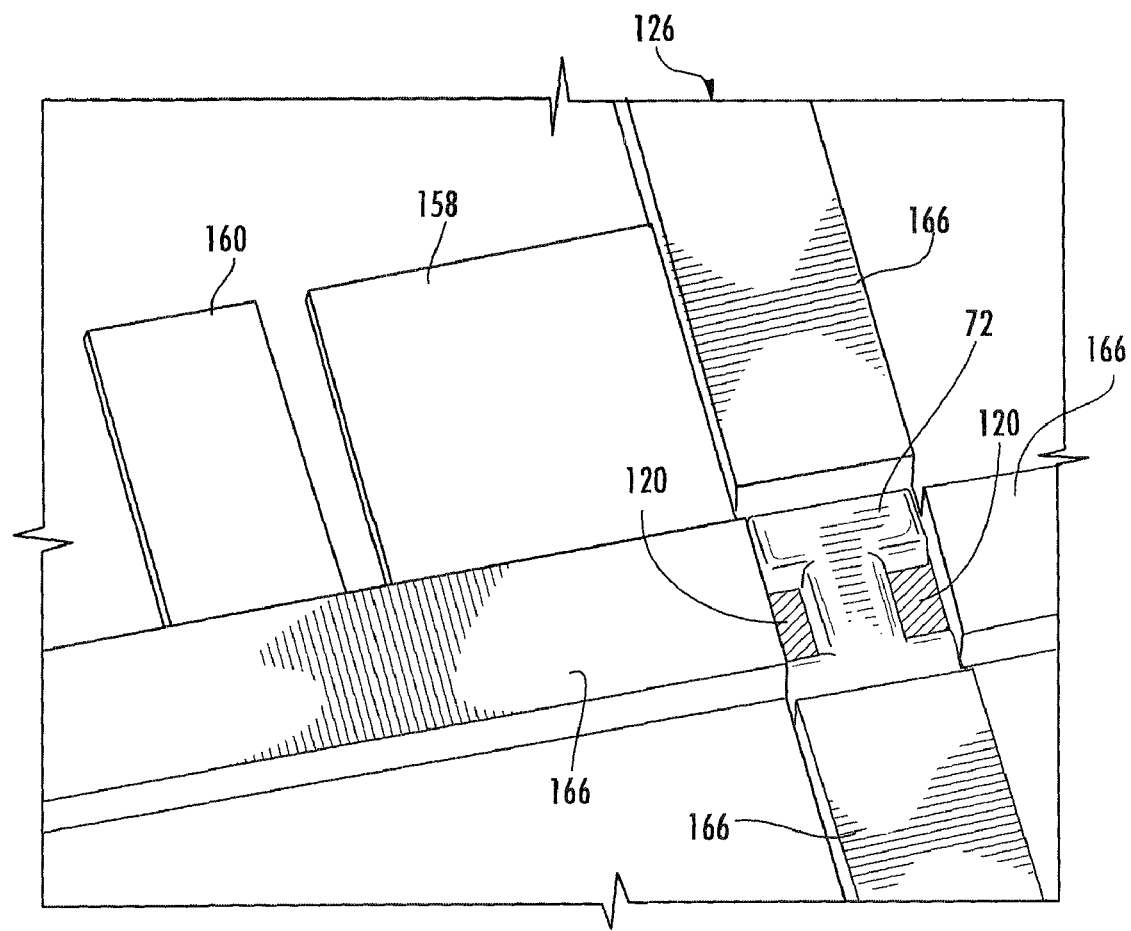
Figure 18:
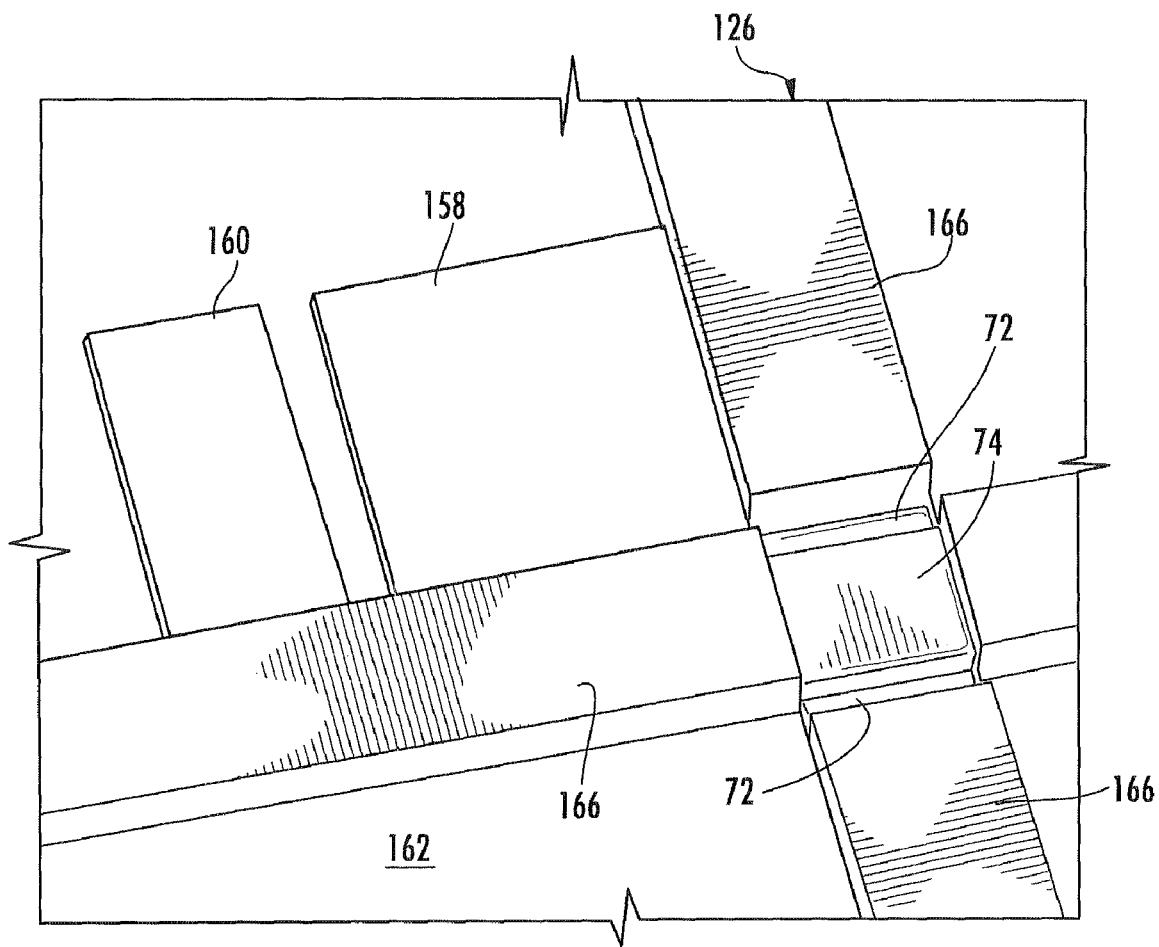

FIGS. 17 and 18 illustrate the formation of crossover bridge 74 (shown in FIG. 7). As shown in FIG. 17, embossed features 178 (shown in FIG. 12) are removed to expose the underlying portions of blanket 120. According to one embodiment, embossed features 170 are removed using an anisotropic dry etch. In one embodiment where barriers 72 were formed by electrodepositing a dielectric capable material, such as a PEDOT:PSS polymer mixture (Poly(3,4 ethylenedioxythiopene) poly(styrensulfonate), embossed features 176 may be removed using an oxygen plasma etch, deactivating the PEDOT:PSS polymer mixture such that the PEDOT:PSS polymer mixture material of barriers 72 becomes dielectric. In other embodiments, the PEDOT:PSS polymer mixture material of barriers 72 may be deactivated or made dielectric using other oxidizing chemicals. In embodiments where barriers 72 are formed by electrodepositing a dialectic material, such as Shipley Eagle 2100ED or similar material, embossed features 176 may be removed by processes which do not oxidize or deactivate otherwise electrically conductive materials of barriers 72.

As shown by FIG. 18, crossover bridge 74 is formed on the exposed portions of blanket 120 shown in FIG. 17 and over, across and spanning intermediate portions of barriers 72. According to one embodiment, the electrically conductive materials of crossover bridge 74 are formed by electrodepositing one or more electric conductive materials. The electrodeposition continues until lateral growth of the plating forms a bridge over barriers 72. The one or more electric conductive materials are immune to the processes or solutions that will subsequently be used to etch electric conductive materials of blanket 120. In one embodiment, the electrically conductive materials of crossover bridge 74 may be the same materials as previously used for forming layer 184 (shown FIG. 13). Once again, because crossover bridge 74 is formed by electroplating, the number of photolithography steps is reduced, reducing fabrication cost and complexity. In other embodiments, crossover bridge 74 may be formed by other methods.

Figure 19:
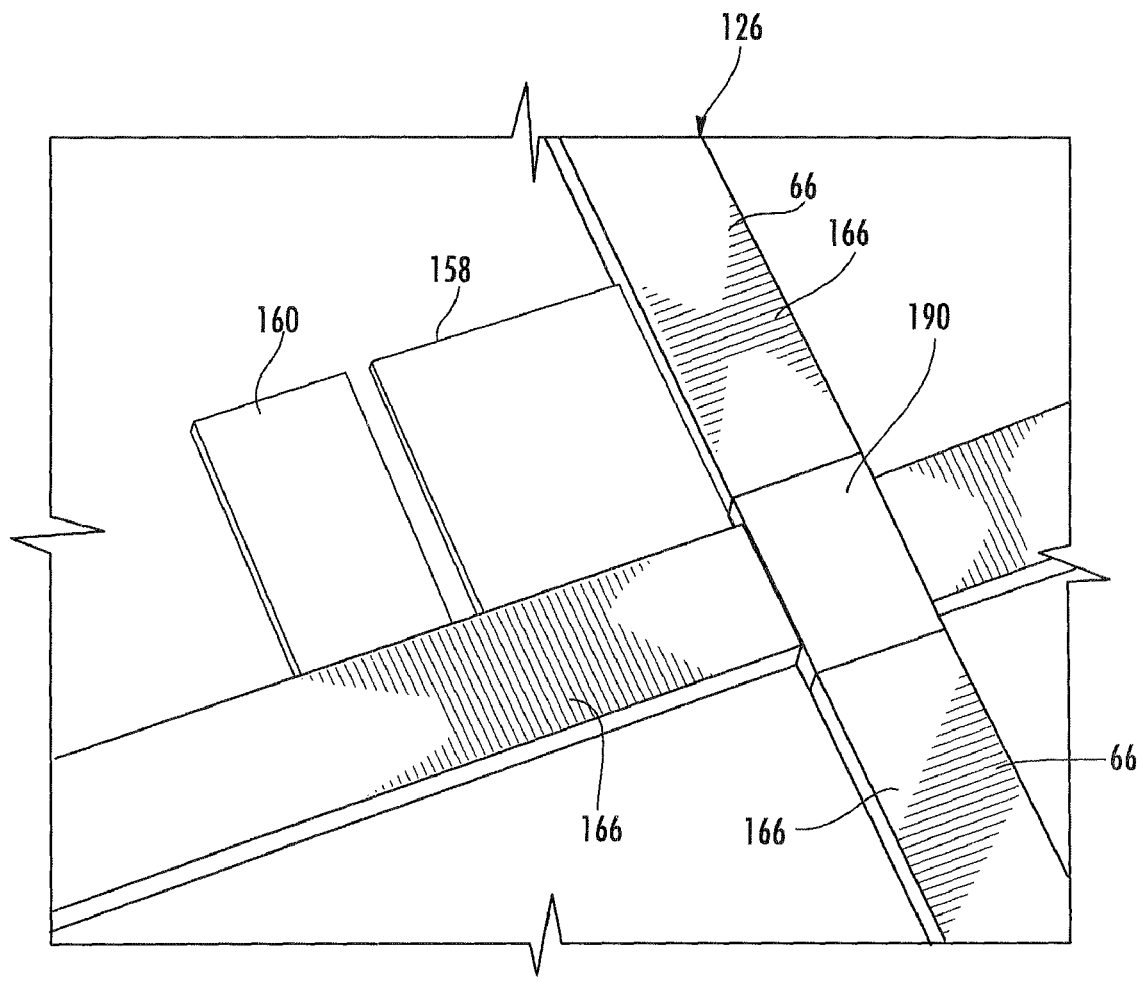

FIG. 19 illustrates capping and installation of crossover bridge 74. As shown by FIG. 19, a dielectric material or a dielectric capable material is electrodeposited atop crossover bridge 74 to form a cap 190. In one embodiment, the dielectric material may comprise one or more polymers, wherein charged particles in the polymers are attracted to crossover bridge 74. In another embodiment, a dialectic capable material, such as PEDOT:PSS polymer mixture, may be electrodeposited and subsequently deactivated or made dielectric through oxidation. According one embodiment, the electrodeposited cap 190 is formed so as to have a top surface that substantially matches a top surface of embossed features 166 which form sidewalls 66.

Figure 20:
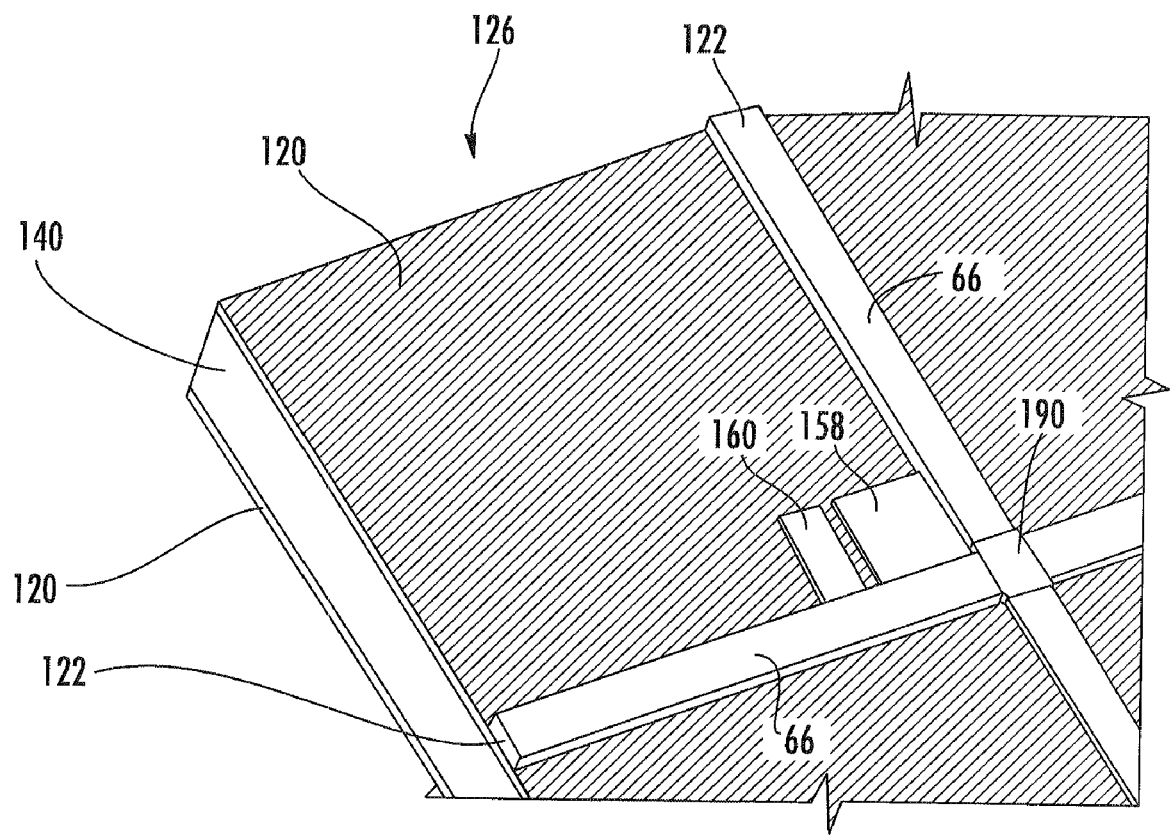
FIG. 20 is an enlarged perspective view of the panel of FIG. 19 illustrating the panel after removal of portions of the embossable layer according to an example embodiment.
Figure 21:
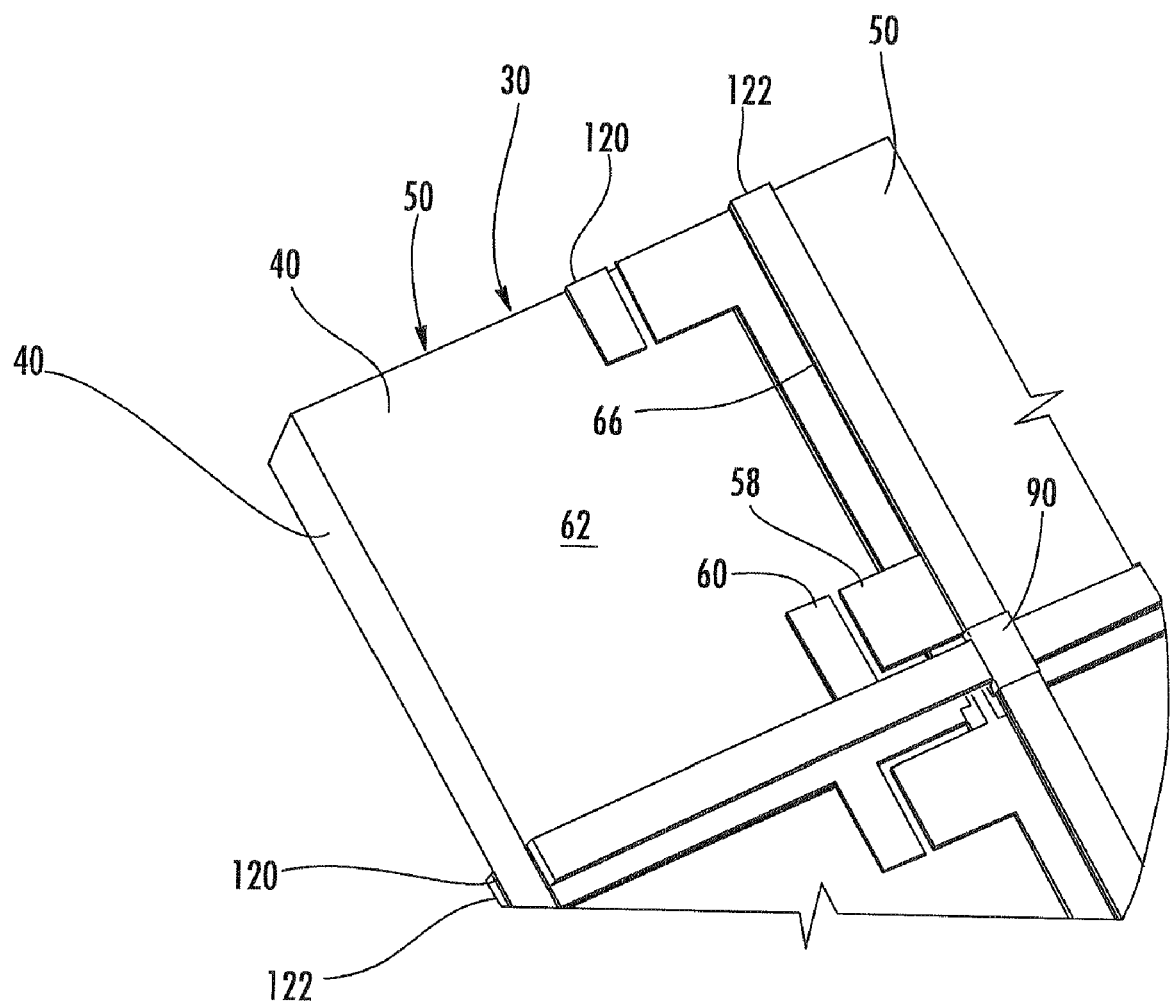
FIG. 21 is an enlarged perspective view of the panel of FIG. 20 illustrating the panel after removal of portions of the blanket conductive layer according to an example embodiment.

FIGS. 20 and 21 illustrate the exposure of the transparent substrate which forms floor 62 (shown in FIG. 2). As shown in FIG. 20, embossed features 162 (those portions of layer 122 between sidewalls 66 and above floor 62), the fourth lowest level of the original embossed pattern shown in FIG. 10, are removed. In the embodiment illustrated, layer 122 is anisotropically dry etched until blanket 120 above floor 62 is exposed. As further shown by FIG. 20, such removal of layer 122 is stopped prior to removal of embossed features 158 and 160. Such embossed features 158, 160 remain to protect underlying portions of blanket 120 which serve as electrodes 58, 60. As with the aforementioned steps, photolithography is not employed, reducing fabrication complexity and cost. In other embodiments, however, photolithography or other fabrication techniques may alternatively be employed to selectively remove embossed feature 162 and portions of blanket 120 underlying the embossed features 162.

As shown in FIG. 20, portions of blanket 120 underlying floor 62 are removed. In the example about illustrated, the exposed blanket 120 is wet etched until the transparent substrate 40 is exposed. In other embodiments, the exposed portions of blanket 120 overlying floor 62 may be removed in other manners.

FIG. 21 illustrates the pattern aligned architecture shown in FIG. 2. In one embodiment, the aforementioned processes and steps are concurrently performed on both sides of substrate 40 to enhance processing efficiency and enhance alignment. In other embodiments, the processes on the opposite sides of substrate 40 may be carried out at different times. After the illustrated patterned and aligned architecture of 21 is completed, various other processes and methods may be performed to complete pixel stack 30. For example, pixel wells 56 are subsequently at least partially filled with electro-optical 52 (shown in FIG. 2). In particular embodiments, the electro-optical material 52 is further retained or capped by covers 34, 36 and spacer 38. Electrical conductor lines 54, 55 are further electrically connected to controller 26 (shown in FIG. 2) and one or more stacks 30 are stacked upon one other. As noted above, in some embodiments, a dielectric coating may be applied over sidewalls 66 to insulate edges of conductor lines 54, 56. Overall, above-described processes facilitate fabrication of display panel 24 (shown in FIG. 1) or other display panels with fewer less complex and less expensive fabrication steps. At the same time, the above process provides enhanced alignment of pixels 50 of stacked pixel layers 42, 44.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A method comprising:
    providing a dielectric substrate;
    concurrently forming or forming features for locating pixel wells and electrodes associated with each pixel well on opposite sides of the substrate.

2. The method of claim 1 further comprising:
    concurrently embossing opposite sides of a panel including the dielectric substrate sandwiched between blankets of conductive material and opposite layers of embossable material to form the pixel wells on opposite sides of the substrate; and
    selectively removing portions of the blankets of the conductive material and the layers of embossable material to form a first electrode and a second electrode along a floor of each pixel well, wherein portions of each blanket form portions of pixel wells sidewalls, the first electrode and the second electrode.

3. The method of claim 2 further comprising:
    removing portions of the blanket to form a grid including first conductor line associated with the first electrode and a second line associated with the second electrode, wherein portions of the second conductor line are removed at an intersection of the first conductor line and the second conductor line;
    electrophoretically depositing a dielectric material or a dielectric capable material that is subsequently made dielectric to form a dielectric layer on the first conductor line at the junction; and electrophoretically depositing a conductive material on portions of the blanket and over the dielectric layer to form a grid crossover.

4. The method of claim 3, wherein the dielectric capable material comprises a PEDOT:PSS polymer mixture (Poly(3,4 ethylenedioxythiopene) poly(styrensulfonate) and wherein the PEDOT is subsequently made dielectric through oxidation, or wherein the dielectric material is a UV curable dielectric material.

5. The method of claim 2, wherein the embossable material comprises a UV curable resin.

6. The method of claim 2, wherein the embossing is with opposing multi-level embossing stamps that are x-y feature aligned.

7. The method of claim 2, wherein the dielectric substrate is a transparent polymer.

8. The method of claim 1, wherein the dielectric substrate is a transparent polymer.

9. The method of claim 1 further comprising an electric field or charge to a charge responsive optical material in the pixel wells.

10. A method comprising:
   embossing a first side of a panel including a dielectric substrate supporting a first blanket of conductive material sandwiched between the dielectric substrate and a first embossable layer to form first pixel wells; and
   selectively removing portions of the first blanket of conductive material and portions of the first layer of embossable material to form first and second pixel electrodes along a floor of each first pixel well, wherein portions of the first blanket form first pixel well sidewalls and the first and second pixel electrodes,
   and wherein the first and second first pixel electrodes form a foundation under a centerline of the first pixel well sidewalls.

11. The method of claim 10, wherein the panel includes a second blanket of conductive material sandwiched between the dielectric substrate and a second embossable layer and wherein the method further comprises:
   embossing the second side of the panel to form second pixel wells; and
   selectively removing portions of the second blanket of conductive material and portions of the second layer of embossable material to form first and second second pixel electrodes along a floor of each second pixel well, wherein portions of the second blanket form second pixel well sidewalls and the first and second second pixel electrodes.

12. The method of claim 11, wherein the first side and the second side of the panel are concurrently embossed.

* * * * *

UNITED STATES PATENT AND TRADEMARK OFFICE
CERTIFICATE OF CORRECTION

| | | |
|---|---|---|
| PATENT NO. | : 7,838,313 B2 | Page 1 of 1 |
| APPLICATION NO. | : 11/831586 | |
| DATED | : November 23, 2010 | |
| INVENTOR(S) | : Alan R. Arthur et al. | |

It is certified that error appears in the above-identified patent and that said Letters Patent is hereby corrected as shown below:

In column 12, line 6, in Claim 10, delete "second pixel" and insert -- second first pixel --, therefor.

Signed and Sealed this
Third Day of July, 2012

David J. Kappos
*Director of the United States Patent and Trademark Office*